United States Patent
Kimura et al.

[11] Patent Number: 6,146,609
[45] Date of Patent: Nov. 14, 2000

[54] AMORPHOUS SUBSTANCE FOR WAVELENGTH CONVERSION AND A MAKING PROCESS OF THE SAME

[75] Inventors: Hideo Kimura; Toru Katsumata; Rieko Sakai, all of Ibaraki, Japan

[73] Assignee: National Research Institute for Metals, Ibaraki, Japan

[21] Appl. No.: 09/236,610

[22] Filed: Jan. 26, 1999

[30] Foreign Application Priority Data

Jan. 28, 1998 [JP] Japan ................... 10-015214

[51] Int. Cl.⁷ .............. C01B 35/10; G02F 1/35
[52] U.S. Cl. ............ 423/277; 423/279; 359/326
[58] Field of Search .................. 423/277, 279, 423/596, 600; 359/326

[56] References Cited

U.S. PATENT DOCUMENTS

| | | | |
|---|---|---|---|
| 4,861,734 | 8/1989 | MacDowell | 501/10 |
| 4,897,249 | 1/1990 | Ross et al. | 423/279 |
| 5,104,845 | 4/1992 | Montag et al. | 423/277 |
| 5,264,407 | 11/1993 | Satek et al. | 423/277 |
| 5,833,939 | 11/1998 | Kimura et al. | 423/277 |

FOREIGN PATENT DOCUMENTS 4-26596 1/1992 Japan ................... 423/277

*Primary Examiner*—Ngoc-Yen Nguyen
*Attorney, Agent, or Firm*—Wenderoth, Lind & Ponack, L.L.P.

[57] ABSTRACT

An amorphous substance has a nominal composition expressed by a general formula of $Ba(B_{1-x}M_x)_2O_4$ (where M is at least one element selected from the group consisting of Al and Ga, and $0.05<x<0.20$).

3 Claims, 3 Drawing Sheets

AMORPHOUS SUBSTANCE FOR WAVELENGTH CONVERSION AND A MAKING PROCESS OF THE SAME

FIELD OF THE INVENTION

The present invention relates to an amorphous substance for wavelength conversion and a making process of the same. More particularly, the present invention relates to an amorphous substance for wavelength conversion, which is useful for optical parts such as a laser device and a non-linear optical device, and to a making process of the same.

DESCRIPTION OF THE PRIOR ART

A substance having a nominal composition expressed by a formula of $BaB_2O_4$ has been known as a glassy amorphous substance. It has also been known that the glassy substance of $BaB_2O_4$ is made by a manner in which a melt having a stoichiometric composition, whose melting point is 1100° C., is quenched by a single roll method.

While the $BaB_2O_4$ is expected to develop into a new functional material because of its substantial characteristics, i.e., an amorphous glassy substance and a composite oxide comprising Ba and B, the $BaB_2O_4$ has a limit in optical functions, for example, it does not exhibit a secondary non-linear optical effect, which is resulted from a structural fact that the $BaB_2O_4$ has a center of symmetry. In addition, a single crystal of the $BaB_2O_4$ has direction dependency and therefore precise direction control is required when a single crystal is obliged to generate a non-linear optical effect.

The present invention has an object to overcome the conventional technical limit and to provide a new manner which realizes exhibition of a non-linear optical effect, which is one of the optical functions.

This and other objects, features and advantages of the invention will become more apparent upon a reading of the following detailed specification and drawings, in which;

DETAILED DESCRIPTION OF THE INVENTION

Figure 1:
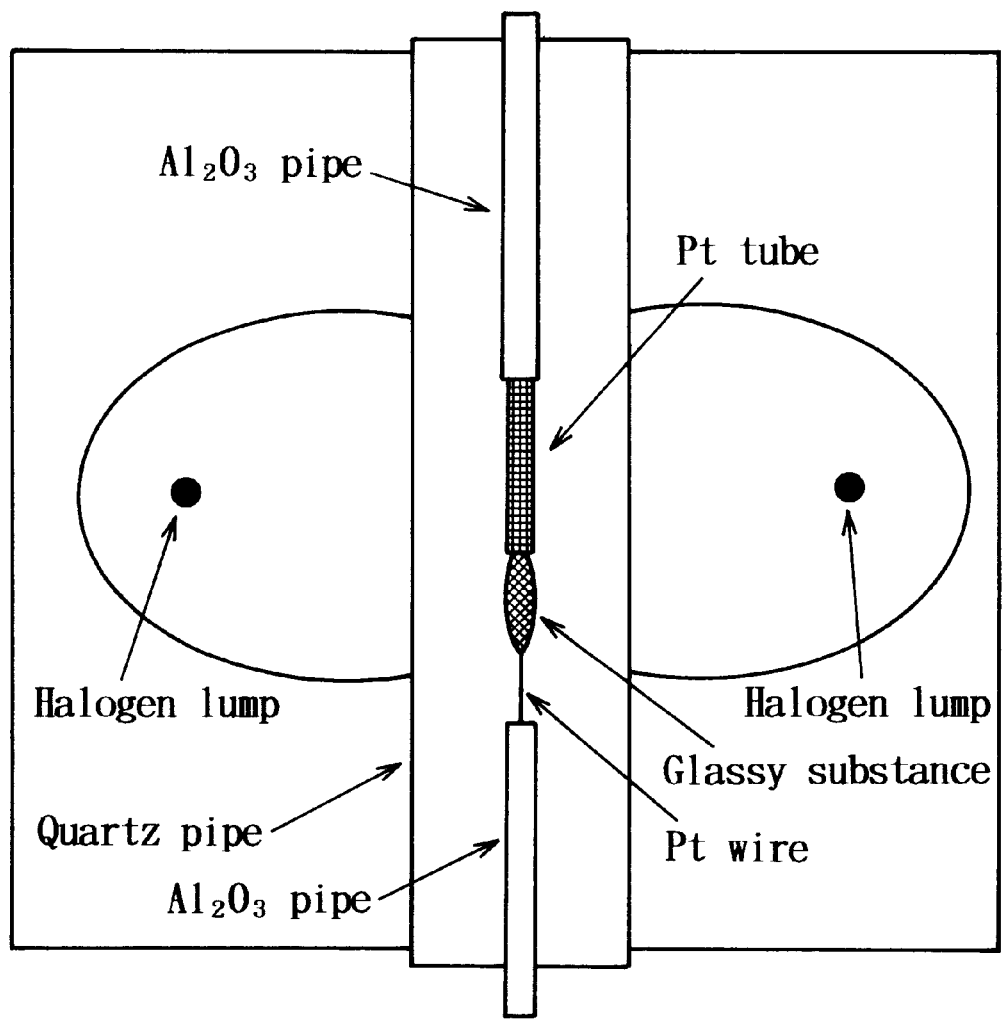
FIG. 1 is a schematic view of a floating zone melting apparatus having a double ellipsoidal mirror and a halogen lump, which is thought to be useful for an amorphous substance for wavelength conversion of the present invention.

The present invention provides an amorphous substance having a nominal composition expressed by a general formula of $Ba(B_{1-x}M_x)_2O_4$ (where M is at least one element selected from the group consisting of Al and Ga, and $0.05<x<0.20$).

The present invention also provides a making process of the amorphous substance above-mentioned, comprising the steps of melting a crystalline raw substance and rapidly cooling a melt of the raw substance down to 680~720° C. More particularly, the present invention provides a making process of the amorphous substance, in which a crystalline substance is molten by a floating zone method in a noble metallic tube, a noble metallic wire is come into contact with a melt of the raw substance in order to rapidly cool the melt down to 680~720° C., and the melt is drawn downward with the noble metallic wire.

An amorphous substance of the present invention is characterized by the facts that it has a nominal composition expressed by the general formula above-mentioned. and it is an amorphous glassy substance. In the general formula above-mentioned, the symbol of "M" is restricted to be either Al or Ga, or both. The subscript of "x" is restricted to be $0.05<x<0.20$. The $Ba(B_{1-x}M_x)_2O_4$ with these restrictions exhibits a secondary non-linear optical effect.

A structure of the $Ba(B_{1-x}M_x)_2O_4$ is characterized by the fact that a portion of asymmetry is formed around a B atom. A wavelength-conversion function is exhibited by generation of second harmonics at the portion where a symmetric center is disturbed by the formation of a B-M pair.

In the case that the amount of M in the above-mentioned formula is $x \leq 0.05$, a glassy substance cannot be obtained except by such a rapid cooling method as a single roll method or a quenching method. Besides, even the glassy substance made by the rapid cooling method has so ribbon-like a shape that it is lack of practical use. In the case that the amount of M is $0.20 \leq x$, distortion of symmetry near the B-M pair is so great that a non-linear optical effect does not exhibit well.

While production of crystals is suppressed, the amorphous substance for wavelength conversion of the present invention can be reproducibly made by a process in which a crystalline raw substance is molten and a melt is immediately and rapidly cooled down to 680~720° C. A raw crystal is molten at its melting point of 1050° C. or around, actually within 1000~1100° C.

A melt is rapidly cooled down to 680~720° C. at once. The temperature range is most suitable for making of a glassy substance. Since a glassy substance excellent in symmetry is a base, a homogenous glassy substance is reproducibly made. In addition, it is unnecessary to take into consideration about direction dependency and therefore the glassy substance is possible to be made into several devices.

A manner which the inventors have previously provided, i.e., the manner for growing single crystals by a floating zone method using a noble metallic tube and wire can be more concretely and preferably applied to the making process of the glassy substance.

As illustrated in FIG. 1, for example, crystals as a raw material are inserted into a tube made of a noble metal such as platinum and the tube is hanged using a $Al_2O_3$ pipe. Those crystals are molten by heating with a halogen lump and an ellipsoidal mirror heater which has, for example, a single, double or quadruple ellipsoidal shape. A noble metallic wire is inserted from an opening at a lower end of the noble metallic tube and is come into contact with a melt of the raw material. The melt is, as mentioned above, rapidly cooled down to 680~720° C., the noble metallic wire is drawn downward and then an amorphous glassy substance is made.

Of course, a making process is not restricted by the above-mentioned manner, but an amorphous substance for wavelength conversion of the present invention is possible to be easily and efficiently made according to such a manner as mentioned above.

Drawing downward after rapid cooling to 680~720° C. can be generally conducted at a rate of 5~30 mm/h, for example. Rapid cooling below 680° C. is not preferable because crystallization suddenly begins. Cooling down to over 720° C. is not preferable because not only the production of a substance is slow but also the substance is a crystalline one. The drawing rate either of slower than 5 mm/h or of higher than 30 mm/h is not preferable because crystallization occurs on the way in the former and shape control of a glassy substance produced is difficult in the latter.

Now, the present invention will be explained more in detail by way of following examples.

EXAMPLE 1

$Ba(B_{0.9}Al_{0.1})_2O_4$, whose melting point is 1050° C., in amount of 10 g was molten under an air atmosphere using a Pt crucible with the size of 30 mm both in diameter and in height in a muffle-type resistance heating electric furnace. A Pt tube of 4 mm in diameter and of 50 mm in length was dipped in a melt and the melt was crystallized after it was introduced into the Pt tube. A crystal in the Pt tube has the length of 20 mm and the weight of 2 g. Using the crystal as a feeding raw material, an amorphous glassy substance was made in a floating zone melting apparatus with which a double ellipsoidal mirror heater and a halogen lump were provided.

As shown in FIG. 1, the Pt tube in which the feeding raw material was put was hanged by fixing its upper portion to a tip of a $Al_2O_3$ pipe. A Pt wire with the diameter of 1 mm, whose upper tip portion was shaped into a sphere of 1.5 mm in diameter, was inserted from a lower end of the Pt tube. The raw material in the tube was molten by heating up to 1050° C. and the Pt wire was come into contact with a melt. After contact, temperature was immediately and rapidly decreased down to 700° C. and the Pt wire was drawn downward at a rate of 20 mm/h. A transparent glassy substance was formed at a tip of the Pt wire according to the drawing. A glassy substance for wavelength conversion, whose diameter and length at a cylindrical portion were 2 mm and 40 mm, respectively, was made after 2 hours.

Figure 2:
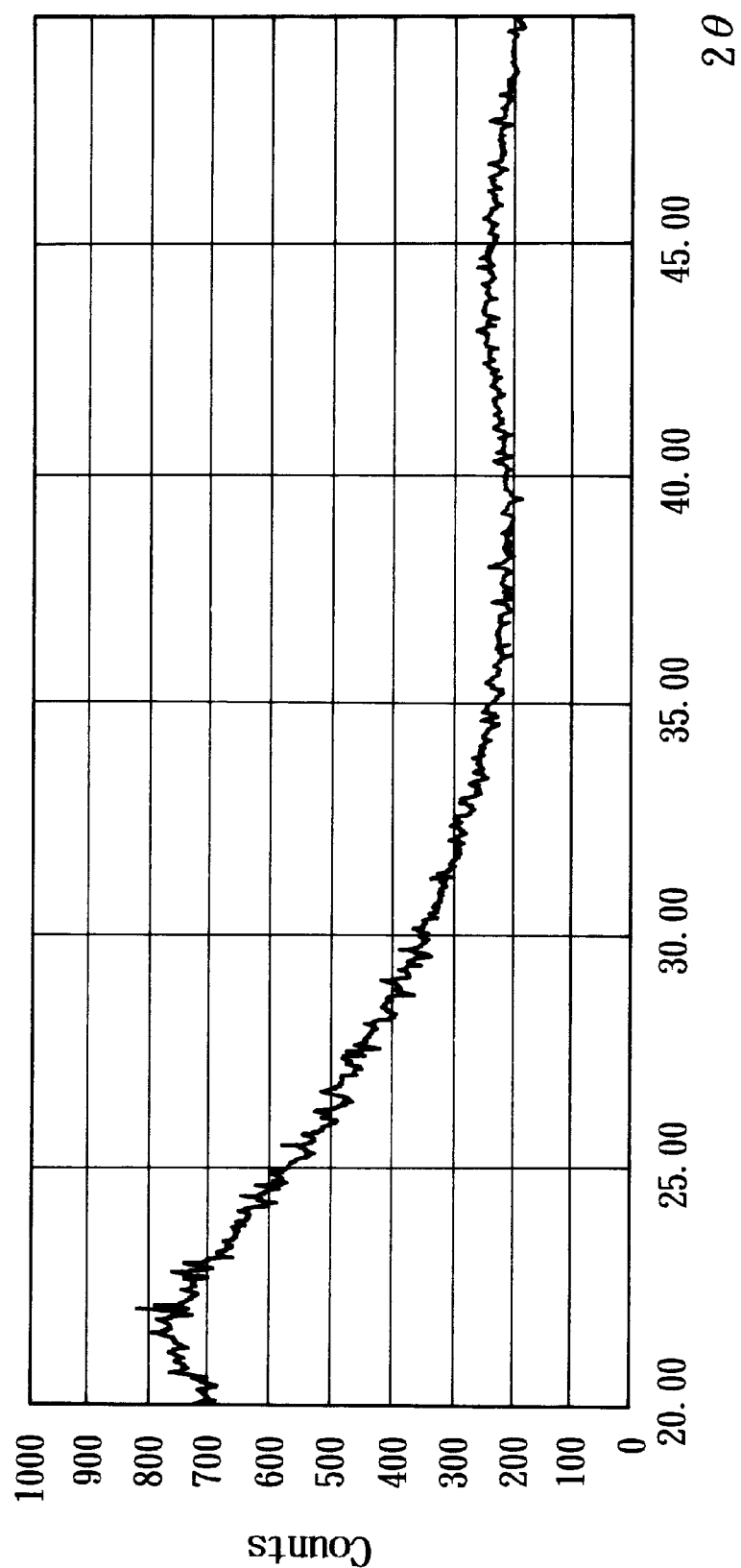
FIG. 2 illustrates a powder X ray diffraction pattern of an amorphous substance for wavelength conversion of the present invention.

FIG. 2 shows a powder X ray diffraction pattern of a substance for wavelength conversion made. The substance for wavelength conversion made was recognized to be an amorphous glassy substance by observing a halo pattern in the powder X ray diffraction analysis.

Figure 3:
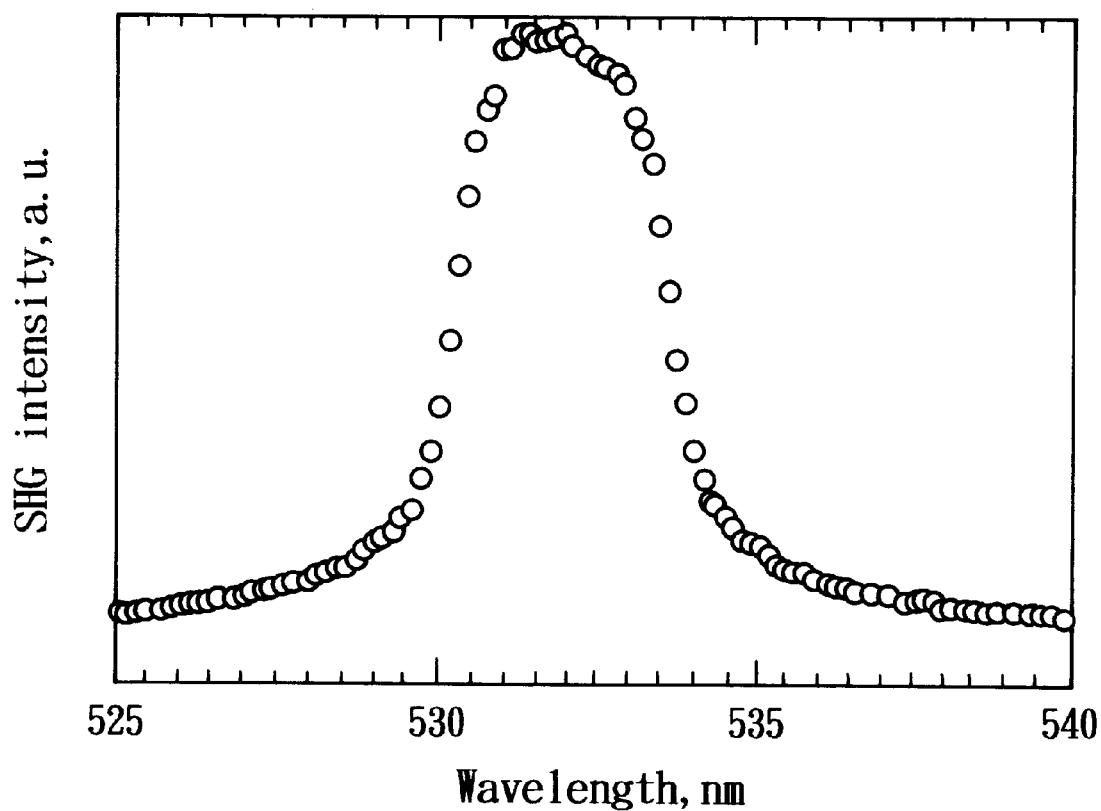
FIG. 3 is a diagram which illustrates intensity of second harmonics generated when YAG laser of 1064 nm in wavelength was irradiated to an amorphous substance of the present invention at room temperature (25° C.).

FIG. 3 shows intensity of second harmonics generated when YAG laser with wavelength of 1064 nm was irradiated to the substance for wavelength conversion at room temperature (25° C.). Second harmonics with wavelength of 532 nm was generated, by which a non-linear optical effect was confirmed.

As was similar in the above, in the case that M of the general formula above-mentioned, making of a substance for wavelength conversion was possible and a secondary non-linear optical effect was obtained. In the case of using a floating zone melting apparatus, with which a single or quadruple ellipsoidal mirror as well as a halogen lump was provided, also, making of a glassy substance for wavelength conversion was possible and a secondary non-linear optical effect was obtained.

EXAMPLE 2

$Ba(B_{0.9}Al_{0.05}Ga_{0.05})_2O_4$, whose melting point is 1050° C., in amount of 10 g was molten under an air atmosphere using a Pt crucible with the size of 30 mm both in diameter and in height in a muffle-type resistance heating electric furnace. A Pt tube of 4 mm in diameter and of 50 mm in length was dipped in a melt and the melt was crystallized after it was introduced into the Pt tube. A crystal in the Pt tube has the length of 20 mm and the weight of 2 g. Using the crystal as a feeding raw material and according to the manner of Example 1, an amorphous glassy substance was made in a floating zone melting apparatus with which had a double ellipsoidal mirror heater and a halogen lump were provided. A glassy substance for wavelength conversion, whose diameter and length at a cylindrical portion were 2 mm and 40 mm, respectively, was made.

As was similar in Example 1, a substance for wavelength conversion made was analyzed by a powder X ray diffraction. A halo pattern similar to that which is shown in FIG. 2 was observed and the substance made was confirmed to be an amorphous glassy one.

When YAG laser of 1064 nm in wavelength was irradiated to the glassy substance at room temperature (25° C.), second harmonics with the wavelength of 532 nm, which is as long as that which was shown in FIG. 3, was generated. A non-linear optical effect was confirmed. The intensity of the second harmonics was greater than that which was observed in Example 1.

Comparison 1

$Ba(B_{0.9}Al_{0.1})_2O_4$, whose melting point is 1050° C., in amount of log was molten under an air atmosphere using a Pt crucible with the size of 30 mm both in diameter and in height in a muffle-type resistance heating electric furnace. A Pt tube of 4 mm in diameter and of 50 mm in length was dipped in a melt and the melt was crystallized after it was introduced into the Pt tube. A crystal in the Pt tube has the length of 20 mm and the weight of 2 g. Using the crystal as a feeding raw material and according to the manner of Example 1, making of an amorphous glassy substance was tried in a floating zone melting apparatus with which a double ellipsoidal mirror heater and a halogen lump were provided.

As was similar in manner adopted in Example 1, the Pt tube in which the feeding raw material was put was hanged by fixing its upper portion to a tip of a $Al_2O_3$ pipe. A Pt wire with the diameter of 1 mm, whose upper tip portion was shaped into a sphere of 1.5 mm in diameter, was inserted from a lower end of the Pt tube. The raw material in the tube was molten by heating up to 1050° C. and the Pt wire was come into contact with a melt. After that, the Pt wire was drawn downward at a rate of 10 mm/h without rapidly cooling. A crystal was formed at a tip of the Pt wire according to the drawing. The crystal grew into the size of 2 mm in diameter and 40 mm in length at a cylindrical portion after 2 hours.

The crystal was not transparent except at a rate of slower than 10 mm/h. It was confirmed by a powder X ray diffraction analysis that the substance was not an amorphous glassy substance but a crystalline one.

When YAG laser of 1064 nm in wavelength was irradiated to the crystal at room temperature (25° C.), second harmonics was observed, but its optical intensity was weaker than that which is shown in FIG. 3.

Comparison 2

$Ba(B_{0.8}Al_{0.2})_2O_4$ in amount of 10 g was molten under an air atmosphere using a Pt crucible with the size of 30 mm both in diameter and in height in a muffle-type resistance heating electric furnace. A Pt tube of 4 mm in diameter and of 50 mm in length was dipped in a melt and the melt was crystallized after it was introduced into the Pt tube. A crystal in the Pt tube has the length of 20 mm and the weight of 2 g Using the crystal as a feeding raw material, making of an amorphous glassy substance was tried in a floating zone melting apparatus with which a double ellipsoidal mirror heater and a halogen lump were provided.

As shown in FIG. 1, the Pt tube in which the feeding raw material was put was hanged by fixing its upper portion to a tip of a $Al_2O_3$ pipe. A Pt wire with the diameter of 1 mm, whose upper tip portion was shaped into a sphere of 1.5 mm in diameter, was inserted from a lower end of the Pt tube. The raw material in the tube was molten by heating up to 1000° C. and the Pt wire was come into contact with a melt. After contact, temperature was immediately and rapidly reduced down to 680° C. and the Pt wire was drawn downward at a rate of 20 mm/h. A transparent glassy substance was formed at a tip of the Pt wire according to the drawing. A glassy substance with the diameter of 2 mm and the length of 40 mm at a cylindrical portion was made after 2 hours.

As was similar in Example 1, the glassy substance made was analyzed by a powder X ray diffraction. A halo pattern similar to that which is shown in FIG. 2 was observed and the substance made was confirmed to be an amorphous glassy one.

When YAG laser of 1064 nm in wavelength was irradiated to the glassy substance at room temperature (25° C.), however, second harmonics was not observed.

What is claimed is:

1. An amorphous substance having a nominal composition expressed by a general formula of $Ba(B_{1-x}M_x)_2O_4$ where M is at least one element selected from the group consisting of Al and Ga, and 0.05<x<0.20.

2. A process of making an amorphous substance having a nominal composition expressed by a general formula of $Ba(B_{1-x}M_x)_2O_4$ where M is at least on element selected from the group consisting of Al and Ga, and 0.05<x<0.20, comprising the steps of melting a crystalline raw substance having said nominal composition to obtain a melt and rapidly cooling the melt of the raw substance down to 680–720° C.

3. The process as claimed in claim 2, wherein said crystalline raw substance is molten by a floating zone method in a noble metal tube, a noble metallic wire is contacted with the melt of the raw substance in order to rapidly cool the melt down to 680–720° C., and the melt is drawn downward with the noble metallic wire.

* * * * *